United States Patent
De Waard et al.

(10) Patent No.: US 7,924,213 B2
(45) Date of Patent: Apr. 12, 2011

(54) METHOD OF AND DEVICE FOR TRACKING AN OBJECT

(75) Inventors: Huub De Waard, Enschede (NL); Piet Griffioen, Hengelo (NL); Henk Regtop, Goor (NL); Gert Van De Brug, Nunspeet (NL)

(73) Assignee: Thales Nederland B.V. (NL)

(*) Notice: Subject to any disclaimer, the term of this patent is extended or adjusted under 35 U.S.C. 154(b) by 43 days.

(21) Appl. No.: 12/441,431

(22) PCT Filed: Sep. 14, 2007

(86) PCT No.: PCT/EP2007/059733
§ 371 (c)(1),
(2), (4) Date: Sep. 10, 2009

(87) PCT Pub. No.: WO2008/031896
PCT Pub. Date: Mar. 20, 2008

(65) Prior Publication Data
US 2010/0013697 A1 Jan. 21, 2010

(30) Foreign Application Priority Data

Sep. 15, 2006 (NL) .................... 1032520

(51) Int. Cl.
*G01S 13/66* (2006.01)
(52) U.S. Cl. .......... 342/59; 342/95; 342/97; 342/107; 342/108; 342/113; 342/115; 342/139; 342/140
(58) Field of Classification Search ............... 342/59, 342/90, 95–97, 107–108, 113, 115, 126, 342/133, 139–140, 145–147
See application file for complete search history.

(56) References Cited

U.S. PATENT DOCUMENTS

| 5,451,960 | A | * | 9/1995 | Kastella et al. | 342/59 |
| 5,525,995 | A | * | 6/1996 | Benner | 342/90 |
| 5,798,942 | A | | 8/1998 | Danchick et al. | |
| 6,359,586 | B1 | | 3/2002 | Sviestins et al. | |
| 6,522,288 | B1 | | 2/2003 | Paradie et al. | |
| 6,738,021 | B2 | * | 5/2004 | Benner et al. | 342/451 |
| 2003/0001778 | A1 | * | 1/2003 | Benner et al. | 342/451 |
| 2005/0077424 | A1 | | 4/2005 | Schneider | |
| 2010/0013697 | A1 | * | 1/2010 | De Waard et al. | 342/59 |

FOREIGN PATENT DOCUMENTS
EP 1531446 A1 * 5/2005

OTHER PUBLICATIONS

Leung, H.; Hu, Z.; Blanchette, M.; , "Evaluation of multiple target track initiation techniques in real radar tracking environments," Radar, Sonar and Navigation, IEE Proceedings—, vol. 143, No. 4, pp. 246-254, Aug. 1996.*
Efe, et al., "Data Fusion for a Surveillance System: Addressing Some Practical Problems" Systems Engineering, 2005 pp. 342-347.
Besada Portas, J.A. , et al. "New approach to online optimal estimation of multisensor biases" IEEE Proceedings: Rada, Sonar & Navigation, Institution of Electrical Engineers, GB vol. 151, No. 1, Feb. 14, 2004, pp. 31-40.

* cited by examiner

*Primary Examiner* — John B Sotomayor
(74) *Attorney, Agent, or Firm* — Stroock & Stroock & Lavan LLP

(57) ABSTRACT

A method of tracking an object including the steps of: collecting N measurements of range $R_i$ and Doppler velocity $D_i$ associated with the object from a plurality M of radar sensors $S_i$ each measurement being assigned a time stamp $t_i$; time aligning each Range $R_i$ measurement to a common time stamp $t_N$ to provide a corresponding time aligned range $P_i$ for each of the N measurements; using each time aligned Range measurement $P_i$ to define a corresponding spherical equation such that N spherical equations are defined; and deriving analytical solutions from three of the N spherical equations to determine the position vector of the object.

22 Claims, 5 Drawing Sheets

METHOD OF AND DEVICE FOR TRACKING AN OBJECT

This is a U.S. National Phase Application under 35 U.S.C. §371 of International Application No. PCT/EP2007/059733, filed on Sep. 14, 2007, and claims benefit of Dutch Patent No. 1032520, filed on Sep. 15, 2006, both of which are incorporated herein. The International Application was published in English on Mar. 20, 2008 as WO 2008/031896 under PCT Article 21 (2).

The present invention relates to a method of and a device for tracking an object; particularly, but not exclusively, the invention relates to a method of and a device for tracking tactical ballistic missiles.

In areas where there is high risk of attack, tactical ballistic missiles (TBM's) are often used to attack civilian and military targets with the purpose of causing as much damage as possible. Due to the high velocity of such missiles (e.g. 5000 m/s), very limited time is available to carry out active or passive defense against a TBM attack such as intercepting the missile or protecting the intended target. Some TBMs easily cover a distance of 2000-4000 km. In order to deploy a suitable defense against such missiles, it is of paramount importance that accurate information on the position, velocity and acceleration of the missile is provided as early as possible.

Conventional methods of tracking TBMs employ a network of distributed radar sensors to detect and track TBMs. The radar sensors provide positional information in terms of range (distance from the object to the sensor), and angular data (azimuth and elevation), and Doppler velocity information on detected TBMs. In order to estimate the "target state", expressed in estimates of position, velocity, and in some cases acceleration of the object to be tracked, as well as the corresponding accuracy, conventional filtering techniques such as extended Kalman filtering, IMM filtering, batch filtering etc are used. These filtering techniques use full measurement vectors containing range, angular and Doppler information.

Such methods suffer from the drawback of the inaccuracy of azimuth and elevation angular information. Even at rather short distances between a measuring sensor and a hostile missile, the accuracy of the range and Doppler data is much higher than the accuracy of the azimuth and elevation (angular) data. When the distance between the sensor and the missile increases, the accuracy of the angular data deteriorates rapidly. Due to the significant error associated with the azimuth and elevation data, the accuracy of the missile position, velocity and acceleration estimates, expressed by a residual error covariance matrix, converges very slowly to the required accuracy. It is even possible that accuracies in the vicinity of steady state accuracies are never obtained because of the slowness of the convergence process. The TBM tracking performance of a distributed radar network implementing these methods can thus be rather poor. Consequently a missile is likely to reach its intended target before any effective intervention can be implemented to protect it.

The present invention has been devised with the foregoing problems in mind.

According to a first aspect of the present invention there is provided a method of tracking an object comprising the steps of collecting N measurements of range $R_i$ and Doppler velocity $D_i$ associated with a said object from a plurality M of radar sensors $S_i$ each measurement being assigned a time stamp $T_i$; time aligning each Range $R_i$ measurement to a common time stamp $t_N$ to provide a corresponding time aligned range $P_i$ for each of the N measurements; using each time aligned Range measurement $P_i$ to define a corresponding spherical equation such that N spherical equations are defined; and deriving exact analytical solutions from 3 of the N spherical equations to determine the objects position [x,y,z].

Since the method exploits only the more accurate range and Doppler data, it provides the advantage that the accuracy of the target state (velocity and position estimates) converges rapidly to the required level of accuracy for determining the position and velocity of the object. Consequently, defense measures can be implemented in time to protect the intended target site. Moreover, it is possible to determine the launching site of the missile. Moreover, the method provides robustness reference frame and radar system error biases. Determining exact analytical solutions for the set of three spherical equations which have to be solved provides high track accuracy compared to prior art methods.

Each range $R_i$ and Doppler velocity $D_i$ measurement may be assigned to an object track.

If the number of measurements N>3, each permutation of 3 spherical equations may be determined and exact analytical solutions for each set of 3 spherical equations may then be determined.

Preferably, each Range measurement $R_i$ is time aligned with the common time stamp $t_N$ using the equation:

$$P_i = R_i + D_i * (t_N - t_i)$$

where $P_i$ is the time aligned range for sensor $S_i$, and $t_i$ is the time of measurement by sensor $S_i$, wherein the time aligned range $P_i$, for each sensor $S_i$, $i \in [1, \ldots, N]$, is used to define a sphere by the equation:

$$(x-a_i)^2 + (y-b_i)^2 + (z-c_i)^2 = (P_i)^2$$

where $a_i$, $b_i$ and $c_i$ are the Cartesian co-ordinates of sensor $S_i$ and [x, y, z] is the estimated position of the object.

The common time stamp $t_N$ may be the time of the most recent measurement.

The position [x, y, z] of the said object may be estimated by determining the intersection of the spheres $(x-a_i)^2 + (y-b_i)^2 + (z-c_i)^2 = (P_i)^2$ defined for 3 of the N sensors $S_i$.

The velocity $[v_x, v_y, v_z]$ of the said object may be estimated as a function of the determined objects position [x,y,z] and Doppler velocity $D_i$ data.

Preferably the velocity $[v_x, v_y, v_z]$ of the said object is estimated by defining the vector $E_i$ between the estimated position [x, y, z] and the position $S_i = [a_i, b_i, c_i]$ of sensor $S_i$ by:

$$E_i = [x-a_i, y-b_i, z-c_i]^T$$

$|E_i|$ being the length of this vector, T being a transposition operator on a vector or matrix defining the Doppler velocity $D_i$ by:

$$D_i = (E_i)^T * v / |E_i| = [(x-a_i)*v_x + (y-b_i)*v_y + (z-c_i)*v_z] / |E_i|$$

where $v = [v_x, v_y, v_z]$ is the estimated velocity of the object at time $t_N$ and is estimated using the N measurements.

defining the unit vector $e_i = E_i / |E_i|$; and solving the N resulting linear equations in $(v_x, v_y, v_z)$.

Exact analytical solutions may be derived from 3 of the N linear equations to determine the objects velocity $(v_x, v_y, v_z)$. Each permutation of 3 linear equations from the N linear equations may be used to derive exact analytical solutions when N>3.

In an embodiment of the invention, the method comprises calculating an accuracy of the position [x, y, z] and/or velocity $[v_x, v_y, v_z]$ estimations.

Preferably the accuracy of the position [x, y, z] and velocity $[v_x, v_y, v_z]$ estimations is calculated by:

expressing the real state of the said object as the vector function f(P(t)) where the vector $$P(t) = (R_1*(t), R_2*(t), R_3*(t), D_1*(t), D_2*(t), D_3*(t),)^T$$

and $R_i^*(t)$ and $D_i^*(t)$ are for sensor $S_i$, the real, but unknown range and Doppler velocity of the object;

determining the non-linear vector function f from the position [x, y, z] and velocity [$v_x$, $v_y$, $v_z$] estimations expressing the estimated target position at time t by the vector function $f(P_e(t))$ where the vector:

$$P_e(t)=(P_1(t),P_2(t),P_3(t),D_1(t),D_2(t),D_3(t),)^T$$

t being the time of the most recent measurement, $P_i(t)$ representing the time aligned range measured by the sensor $S_i$ and $D_i(t)$ is the Doppler velocity measured by the sensor $S_i$;

linearising P(t) in the neighbourhood of $P_e(t)$ to produce:

$$f(P(t))=f(P_e(t))+F^*(P(t)-P_e(t))$$

where F is the Jacobian of the function f(P(t)) which is determined for the point $P_e(t)$.

defining the error covariance matrix for the TBM target state by:

$$E((f(P(t))-f(P_e(t)))^*(f(P(t))-f(P_e(t)))^T)$$

where E represents the expectation, T indicates the transpose operation on a vector or matrix and $f(P_e(t))$ is the estimated mean of the underlying probability density function; and substituting the solution for the vector function f(P(t)) to produce the analytical expression:

$$Cov=E((f(P(t))-f(P_e(t)))^*(f(P(t))-f(P_e(t)))^T)=F^*E((P(t)-P_e(t))^*(P(t)-P_e(t))^T)^*F^T$$

Exact analytical solutions may be derived from 3 of the N equations to determine the accuracy. Each permutation of 3 linear equations from the N equations may be used to derive exact analytical solutions when N>3.

Preferably at least one of the estimation of the position [x, y, z] of the said object, the estimation of the velocity [$v_x$, $v_y$, $v_z$] of the said object and the accuracy of the position [x, y, z] and velocity [$v_x$, $v_y$, $v_z$] estimations are filtered to re-estimate the position and the velocity of the said object.

Preferably, at least one of the estimation of the position [x, y, z] of the said object, the estimation of the velocity [$v_x$, $v_y$, $v_z$] of the said object and the accuracy of the position [x, y, z] and velocity [$v_x$, $v_y$, $v_z$] estimations are filtered to predict the track of the said object.

Preferably the estimates of the position [x, y, z] and velocity [$v_x$, $v_y$, $v_z$] of the said object are used to determine the starting point of a new track.

A second aspect of the invention provides a device for tracking an object, the device comprising data collection means for collecting information signals including range $R_i$ and Doppler Velocity $D_i$ data associated with a said object (10) from a plurality of radar sensors ($S_i$) each range Ri data having a time stamp Ti; time alignment means for time aligning each Range Ri measurement to a common time stamp $t_N$ to provide a corresponding time aligned range $P_i$ for each of the N measurements; position processing means (15) for using each time aligned Range measurement $P_i$ to define a corresponding spherical equation such that N spherical equations are defined; and deriving exact analytical solutions from 3 of the N spherical equations to determine the objects position [x,y,z].

In an embodiment, the device further comprises assigning means (15) for assigning each range $R_i$ and Doppler velocity $D_i$ measurement to an object track.

In an embodiment the device includes velocity processing means for estimating a velocity [$v_x$, $v_y$, $v_z$] of the said object in terms of the position [x,y,z] and Doppler $D_i$ data.

The position processing means (15) may be operable to determine the objects position [x,y,z] according to the method described above The velocity processing means (15) may be operable to estimate the [$v_x$, $v_y$, $v_z$] of the said object according to the method described above The device may further comprise accuracy processing means (15) for calculating an accuracy of the position [x,y,z] and/or velocity [$v_x$, $v_y$, and $v_z$] estimation according to the method described above.

The device may further comprise filter means for filtering at least one of the estimation of the position [x, y, z] of the said object (10), the estimation of the velocity [$v_x$, $v_y$, $v_z$] of the said object (10) and the accuracy of the position [x, y, z] and velocity [$v_x$, $v_y$, $v_z$] estimations.

Preferably the processing means is adapted to filter the estimation of the position [x, y, z] of the said object, the estimation of the velocity [$v_x$, $v_y$, $v_z$] of the said object and the accuracy of the position [x, y, z] and velocity [$v_x$, $v_y$, $v_z$] estimations to predict the track of the said object.

A third aspect of the invention provides a tracking system for tracking an object comprising a plurality of radar sensors Si for providing information signals including Range $R_i$ and Doppler Velocity $D_i$ data associated with a said object, and a device as described above.

A further aspect of the invention provides a computer program product for carrying out the method of tracking the object.

The US patent No. 2005/077424 A1 discloses a system and a method for locating a target and guiding a vehicle toward the target, using a collection of range measurements. However, the US patent No. 2005/077424 A1 does not disclose collecting Doppler measurements for time aligning range measurements. A disadvantage of the solution disclosed in this patent is that range estimation may lack accuracy because of time shift between range measurements.

Embodiments of the invention will now be described, by way of example only, and with reference to the following drawings in which.

Figure 1:
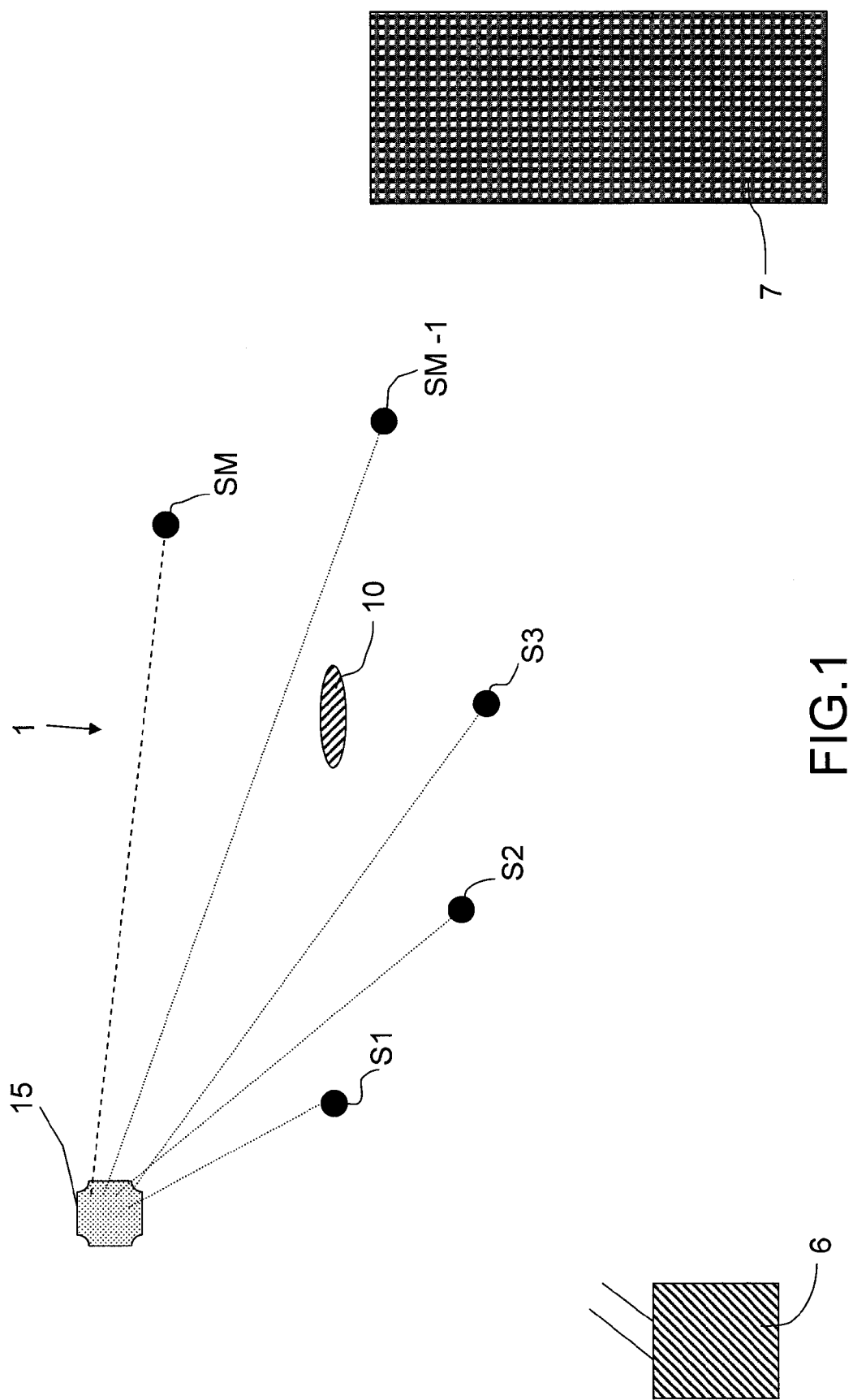
FIG. 1 is a schematic diagram of a system for tracking an object according to an embodiment of the invention.
Figure 2:
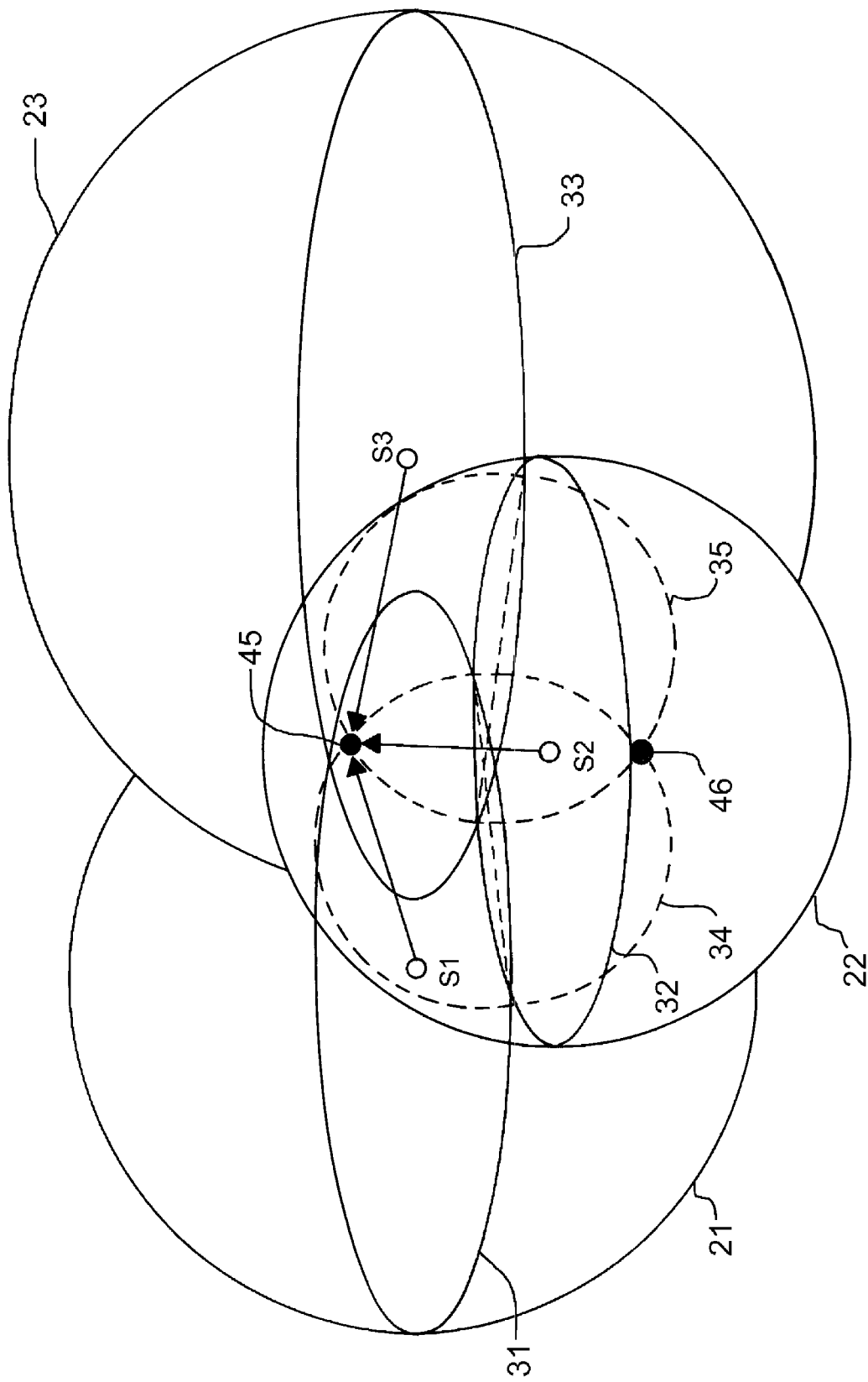
FIG. 2 illustrates a method of estimating the position of an object according to the embodiment of the invention.
Figure 3:
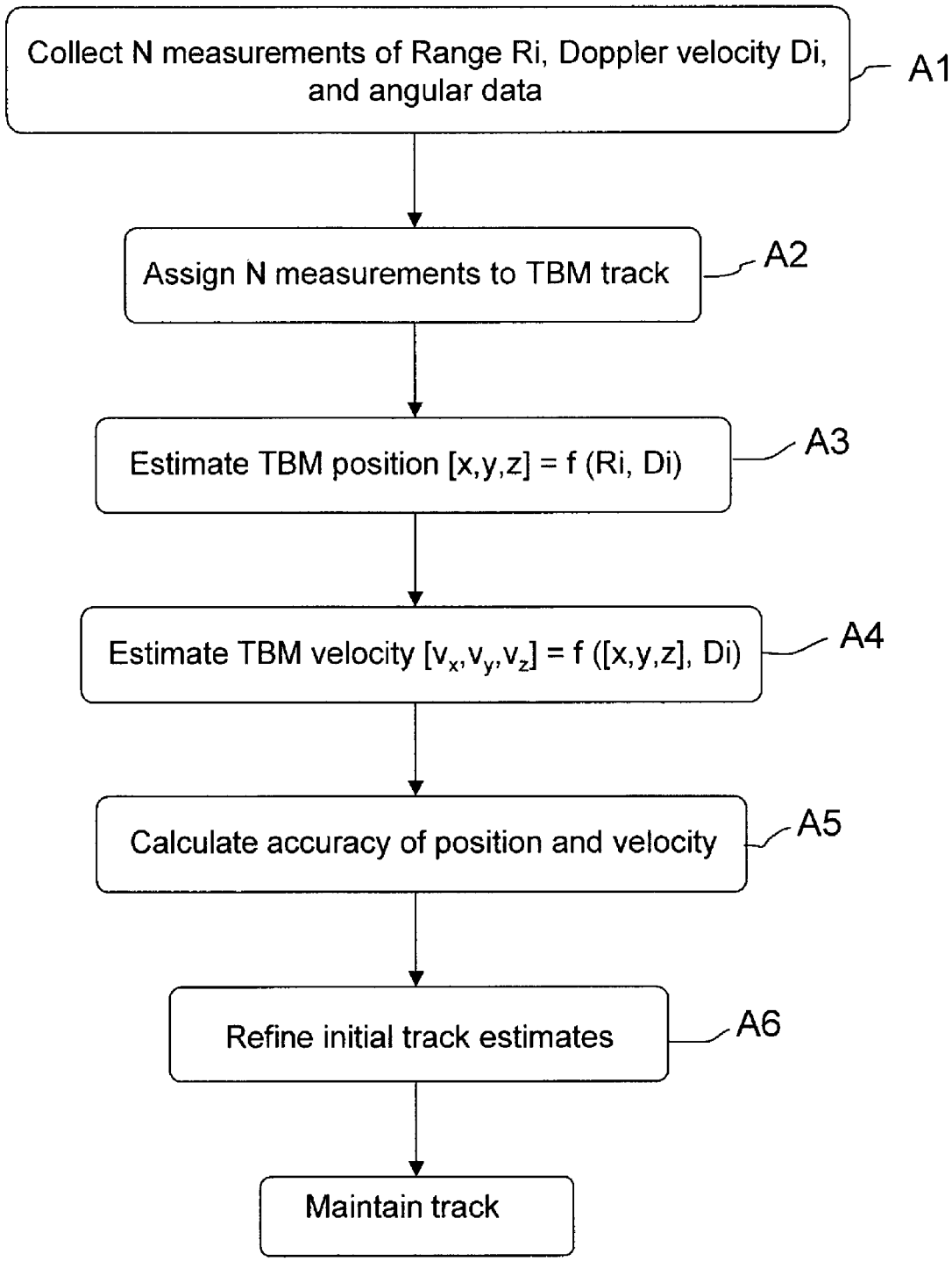
FIG. 3 is a flowchart schematically illustrating the steps of a method of initializing a track of an object according to the embodiment of the invention.
Figure 4:
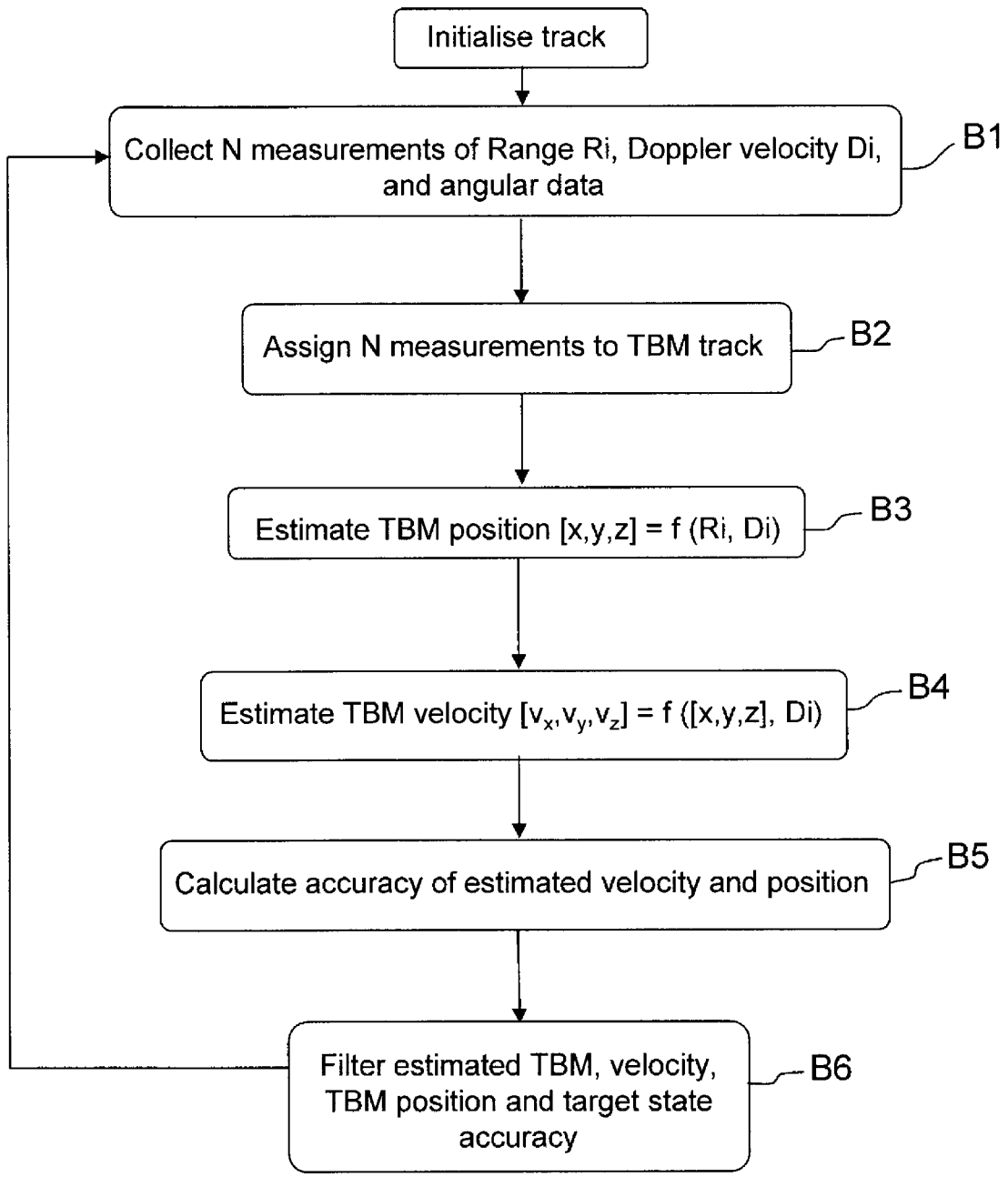
FIG. 4 is a flowchart schematically illustrating the steps of a method of maintaining a track of an object according to the embodiment of the invention.
Figure 5:
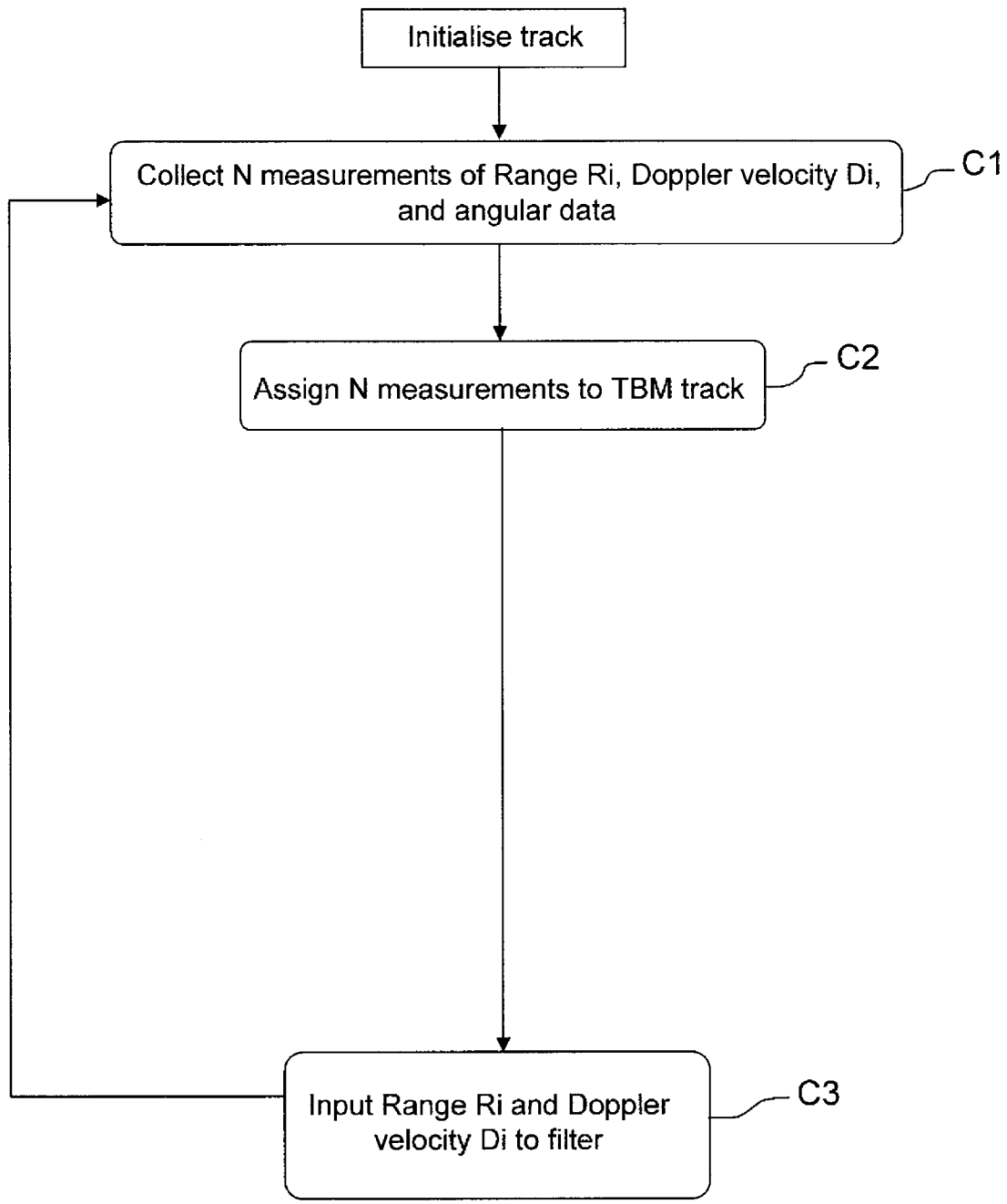
FIG. 5 is a flowchart schematically illustrating the steps of a method of maintaining a track of an object according to a further embodiment of the invention.

FIG. 1 illustrates a distributed radar sensor network 1 according to an embodiment of the invention. The distributed network 1 comprises M radar sensors $S_i$ where, i∈[1, ..., M], positioned at suitable locations [$a_i$, $b_i$, $c_i$] in a surveillance area for the detection and tracking of tactical ballistic missiles. The detection range of each radar sensor $S_i$ is, for example, greater than 400 km. Each radar sensor $S_i$ is configured in a known manner to provide measurements of range, angular (azimuth and elevation) and Doppler velocity for a TBM detected within its area of surveillance. The sensors $S_i$ communicate with a processing node 15 by suitable communication channels with enough bandwidth to transfer the necessary measurement data. The processing node 15 is adapted to process the data received from the radar sensors $S_i$ in order to provide tracking information—position and velocity data, and the corresponding accuracy—on the detected TBM. It will be understood that the network may comprise one or more processing nodes for processing the radar data and that a sensor may be provided with processing means.

It will be understood that the detection range required by each radar sensor will depend on the number of radar sensors positioned in the area of surveillance. In alternative embodiments of the invention it may be sufficient for the radar sensors to have a detection range of less than 400 km.

A method for tracking a missile according to the embodiment of the invention will now be described with reference to FIGS. 1-4. When a missile 10 is launched from launch site 6 towards a target site 7 and passes in the detection range of sensors $S_1 \ldots S_M$, the missile 16 is detected by N sensors during a time interval $\Delta t$ where $N \leq M$, the number of sensors. The N sensors provide N measurements of range, Doppler velocity and angular data associated with the missile 10. Each of the N measurements has a time stamp $t_i$ ($t_1 \leq t_2 \leq \ldots \leq t_N$). The processing node 15 collects the N measurements from the radar sensors $S_1 \ldots S_N$—step A1 of FIG. 3. During a time interval $\Delta t$ of, for example, 5 s, normally at least three measurements are made by three different sensors and collected by the processing node 15. Each measurement is defined by a full measurement vector comprising range $R_i$, angular (azimuth and elevation) and Doppler velocity $D_i$ information measured by the respective sensor $S_i$. It is assumed that the measured Doppler velocities are approximately constant during the interval $\Delta t$.

Each of the N measurements received from the radar sensors $S_1 \ldots S_N$ is then assigned to a TBM track—step A2. If there are no existing tracks, a new track is initialized using the range, Doppler velocity and angular data of the first measurement received from the sensors $S_1 \ldots S_N$ by employing known filtering techniques. Standard gating techniques are used to determine if a measurement originates from a predetermined TBM track. Since the number of objects to be tracked in TBM defense is very low the nearest neighbour approach of data association is used to assign a measurement to a track. It will be understood that in alternative embodiments of the invention more sophisticated data association methods such as k-best multiple hypotheses tracking (k-best MHT) multidimensional assignment (MDA) etc. may be employed to assign a measurement to a TBM track. Assigning a TBM to a track helps to give more accurate measurements of position and velocity more rapidly.

In order to position the correlation gate, the tracks are predicted to the time stamp of the measurement to be correlated using the prediction step of a suitable TBM filter. Assuming that the most recent measurement made at time $t_1$ has been processed by a TBM filter and a new measurement is made at time $t_2$. The TBM filter predicts the possible position over the time interval $t_2-t_1$ and positions the correlation gate at the predicted TBM position. A correlation gate is the volume in space where the likely measurements originating from the TBM fall.

Using the N range $R_i$ and Doppler velocity $D_i$ measurements collected from N sensors $S_i$, the velocity and position of the missile 10 is estimated according to the technique outlined below to provide complete measurements of velocity and position. The complete measurement accuracy is calculated. The error covariance matrix is determined by the accuracy calculation. Using the Mahalanobis distance and the estimated complete measurement covariance matrix, it is possible to determine a volume around the estimated TBM state which contains the likely actual TBM states.

The estimated position and velocity and corresponding accuracy are used to refine the initialized track data. For the initialized track residual error covariance matrix, a pre-defined standard deviation for the acceleration is used. Normally, an initial value for the standard deviation is used based on the maximum possible acceleration.

Estimation of Position and Velocity

The estimated position of the missile is determined from the Doppler $D_i$ and range $R_i$ data measurements received from N sensors. $S_1 \ldots S_N$—step A3. $[a_i, b_i, c_i]$ is the position of the radar sensor $S_i$ in Cartesian co-ordinates, the radar sensor $S_i$ being located somewhere on the surface of the earth. N is the number of sensors detecting the TBM or the number of received measurements. Since the probability of detection of a TBM by a single radar scan is normally less than 1, the number of sensors M should be greater than the number of measurements N received. Each of the N measurements has a time stamp $t_i$ ($t_1 \leq t_2 \leq \ldots \leq t_N$). Measurement from sensor $S_i$ contains the information ($R_i, D_i$) where $R_i$ is the range (distance from object to sensor $S_i$), and $D_i$ is the Doppler velocity measured by sensor $S_i$. It is assumed that the N measurements received form the sensors have a different time stamp. The N measurements are sorted in order of time stamp such that $t_N \geq \ldots \geq t_2 \geq t_i$. The N range measurements can be time aligned to the same time stamp $t_N$ of measurement N according to the following equation:

$$P_i = R_i + D_i * (t_N - t_i) \quad \text{(Eq. 1)}$$

Where $P_i$ is the time aligned range for sensor $S_i$ and $T_i$ is the time of the measurement made by sensor $S_i$.

Using the time aligned range $P_i$, for each sensor $S_i$, $i \in [1, \ldots, N]$, a corresponding sphere is defined by:

$$(x-a_i)^2 + (y-b_i)^2 + (z-c_i)^2 = (P_i)^2 \quad \text{(Eq. 2)}$$

where $[x, y, z]$ is the estimated position of the TBM at time $t_N$ and is estimated using $N(R_i, D_i)$ measurements. Each sphere being centered on the position of the sensor $S_i$ which measured the original range $R_i$.

The vector $E_i$ between the TBM's estimated position $[x, y, z]$ and the position $S_i = [a_i, b_i, c_i]$ of sensor $S_i$ is defined by:

$$E_i = [x-a_i, y-b_i, z-c_i]^T \quad \text{(Eq. 3)}$$

$|E_i|$ being the length of this vector. T is a transposition operator on a vector or matrix.

The Doppler velocity $D_i$ is defined by:

$$D_i = (E_i)^T * v / |E_i| = [(x-a_i) * v_x + (y-b_i) * v_y + (z-c_i) * v_z] / |E_i| \quad \text{(Eq. 4)}$$

where $v = [v_x, v_y, v_z]$ is the estimated velocity of the TBM at time $t_N$ and is estimated using the N measurements.

Using the vector $E_i$, the unit vector $e_i = E_i / |E_i|$ is defined. Assuming N measurements are collected and that the Doppler velocity is approximately constant during the time interval $\Delta t$, N linear equations in ($v_x, v_y, v_z$) result. The N linear equations in ($v_x, v_y, v_z$) can then be solved using standard mathematical techniques—step A4.

In an embodiment of the invention the number of radar sensors making measurements of the TBM is 3 and thus N=3. Using the three resulting sphere equations (Eq. 2), it is possible to determine two analytical solutions for the unknown variables (x, y, z) representing the estimated position of the TBM. The solution to the process is graphically illustrated in FIG. 2. Three spheres defined by Eq. 2 for each radar sensor S1, S2 and S3 are illustrated as 21, 22 and 23 respectively. The spheres 21, 22 and 23 are calculated for the time of the last received measurement, for example from sensor S3. The horizontal ellipses 31, 32 and 33 represent the horizontal plane on which the respective sensors S1, S2 and S3 stand. The intersection of a sphere 22 with spheres 21 and 23 results in circles 34 and 35 overlying the first sphere 22. The intersection points of the two circles 34 and 35 represent the two determined solutions 45 and 46 for the estimated position of the missile. One of the solutions 46 may be discarded because it represents a position inside the earth. The remaining solution 45 represents a point in air and represents the estimated position [x, y, z] of the missile 10.

The estimated position [x, y, z] and Doppler velocity Di can then be used to estimate the velocity $[v_x, v_y, v_z]$ of the TBM. Assuming that the three defined unit vectors $e_i$ for the three sensors form a spanning set or basis for the three dimensional velocity space, and that the Doppler velocity $D_i$ measured by sensor $S_i$ is approximately constant during the time interval $\Delta t$, three linear equations in $(v_x, v_y, v_z)$ from Equation 4 result which can then be solved using standard mathematical techniques to derive an analytical solution for the estimated velocity $[v_x, v_y, v_z]$ of the TBM.

Object State Accuracy (Volume) Calculation—Step A5

It is now possible to express the real but unknown TBM state as the vector function f(P(t)) where the vector $$P(t) = (R_1^*(t), R_2^*(t), R_3^*(t), D_1^*(t), D_2^*(t), D_3^*(t),)^T \quad \text{(Eq. 5)}$$

and $R_i^*(t)$ and $D_i^*(t)$ represent the real but unknown Range and Doppler velocity of the TBM for sensor $S_i$. The non-linear vector function f is determined from the analytical solutions for the position [x, y, z] and velocity $[v_x, v_y, v_z]$ of the TBM. The estimated target position at time t is given by the vector function $f(P_e(t))$ where the vector:

$$P_e(t) = (P_1(t), P_2(t), P_3(t), D_1(t), D_2(t), D_3(t),)^T \quad \text{(Eq. 6)}$$

t is the time stamp of the most recent of the three measurements. $P_i(t)$ represents the time aligned range measured by the sensor $S_i$ and $D_i(t)$ is the Doppler velocity measured by the sensor $S_i$. Assuming that the difference between P(t) and $P_e(t)$ is small, it is possible to linearise P(t) in the neighbourhood of $P_e(t)$ which produces:

$$f(P(t)) = f(P_e(t)) + F^*(P(t) - P_e(t)) \quad \text{(Eq. 7)}$$

where F is the Jacobian of the function f(P(t)) which is determined for the point $P_e(t)$.

The error covariance matrix for the TBM target state is defined by:

$$E((f(P(t)) - f(P_e(t)))^*(f(P(t)) - f(P_e(t)))^T) \quad \text{(Eq. 8)}$$

where E represents the expectation, see for example E. J. Dudewicz and S. N Mishra, Modern Mathematical Statistics, Wiley Series in Probablility and Mathematical Statistics, Wiley & Sons, 1988. T indicates the transpose operation on a vector or matrix and $f(P_e(t))$ is the estimated mean of the underlying probability density function. Substitution of the solution for the vector function f(P(t)) produces the analytical expression:

$$\text{Cov} = E((f(P(t)) - f(P_e(t)))^*(f(P(t)) - f(P_e(t)))^T) = F^*E((P(t) - P_e(t))^*(P(t) - P_e(t))^T)^*F^T \quad \text{(Eq. 9)}$$

The error covariance matrix $E((P(t) - P_e(t))^*(P(t) - P_e(t))^T)$ is a diagonal matrix, where the terms are the time aligned variances of the time aligned $(P_i, D_i)$ measurements produced by the different contributing sensors.

The position [x, y, z] and velocity $[v_x, v_y, v_z]$ of the missile estimated according to the techniques described above and the corresponding compete measurement accuracy Cov are used to refine the initial track estimates of the detected TBM—step A6. For the initialized track residual error covariance matrix, a pre-defined deviation for the acceleration is used.

For TBM defense, it is assumed that the transition moment from boost to coast phase is unknown. Furthermore, it is assumed that it is possible that a resumption of thrusting (transition from coast to boost phase) may occur. It is assumed that the selected TBM filter can appropriately handle these kind of phase transitions.

After initialization of a TBM track, a hybrid approach is taken in order to carry out maintenance of the track to further refine the estimates for position and velocity of the missile and the corresponding accuracy. A further N measurements of Range $R_i$ and Doppler velocity $D_i$ are collected from the sensors $S_i$—Step B1. The measurements are assigned to a TBM track using the nearest neighbour approach of data association—step B2. Assuming that in the first embodiment of the invention, the number of measurements N assigned to the TBM track during the time interval $\Delta t$ is 3, new estimates position [x, y, z] and velocity $[v_x, v_y, v_z]$ of the missile and the corresponding accuracy of the estimates are calculated according to the methods previously described using Equations 1 to 9. The complete measurements of position and velocity are then input to an appropriate TBM filter or a least square curve fit filter in order to refine the position and velocity estimates and to predict the ballistic curve of the TBM. The functions of a TBM filter are to refine the actual position and velocity of the missile and/or to predict future position and velocity estimates of the missile based on the information of all the processed measurements. This process of maintaining the track—restimating position, velocity and calculating the corresponding accuracy—may be repeated until the desired level of target state accuracy is reached and defense measures can be implemented. Even if the required target state accuracy is reached the process may be repeated to maintain the track of the TBM until appropriate defense measures can be put into action. The required level of accuracy is usually defined by a volume of 500 m in each direction but may be larger or smaller than this in alternative embodiments of the invention.

In an alternative embodiment of the invention illustrated in FIG. 6, the range $R_i$, Doppler $D_i$ measurements are collected form a sensor Si—step C1, and assigned to a track Step C2. The range $R_i$, Doppler $D_i$ measurements with the corresponding accuracy derived from the full measurement data are directly processed by the TBM filter—step C3. In this case the measurement accuracy in range $R_i$ and Doppler $D_i$ is provided by the measuring sensor $S_i$ and is usually given as a standard deviation.

Thus in accordance with the invention, using the measurements collected by the distributed radar network, a hybrid TBM tracking approach is proposed in which complete measurements comprising estimated position and velocity data or Range and Doppler measurements are used for TBM track initialization and maintenance. Using this hybrid tracking approach, the convergence rate of the accuracy for the TBM track position, velocity and acceleration is maximally increased thereby reducing the time required to reach an acceptable level of accuracy. Consequently, accuracies close to steady state accuracies are possible.

In a further embodiment N measurements where N>3 may be collected by the processing node 15 during a time interval $\Delta t$, where $\Delta t$ is, for example, 5 seconds.

Accordingly, for N (range, Doppler), measurements collected by the processing node 25, N spherical equations derived from Eq. 2 should be solved. A possible method of solving this set of equations is to determine every permutation of three spherical equations for different combination of 3 sensors from the N measuring sensors. Each permutation of three spherical equations is solved by using the analytical solution of the position based on the corresponding three (range, Doppler) measurements provided by three different sensors $S_i$ positioned at suitable locations. The analytical solution for estimating position and velocity has been described above.

For N measurements, the possible number K of sets of 3 equations is given by:

$$K=N!/3!/N-3)! \tag{Eq. 10}$$

where $N!=N(N-1)(N-2)\ldots$ The time interval $\Delta t$ may be selected such that the number of measurements collected, N, is always small.

Assuming that the solution for the position, determined for equation permutation $j(j\in[1,\ldots K]$ is given by $p_j=[x_j, y_j, z_j]$. The estimated position $p_e$ for the complete measurement with time stamp $t_n$ is estimated by:

$$p_e(t_n) = \left(\sum_{j=1}^{K} p_j\right)/K \tag{Eq. 11}$$

Velocity Calculation

For N (range $R_i$, Doppler $D_i$) measurements, N linear equations according to Equation 4 should be solved. Again M permutations, for different combinations of 3 of the N sensors, of three linear equations are solved by using the analytical solutions for velocity $[v_x, v_y, v_z]$ described above, based on the estimated position [x, y, z] and the Doppler information. It is assumed that the solution for equation permutation $j(j\in[1\ldots K]$ is given by $v_j=[v_x^j, v_y^j, v_z^j]$. The velocity for the complete measurement with time stamp $t_n$ is estimated by:

$$v_e(t_n) = \left(\sum_{j=1}^{K} v_j\right)/K \tag{Eq. 12}$$

Target State Accuracy (Volume) Calculation

Solution of the combined set of equation for permutation j, containing three spherical equations for estimating the position [x, y, z] of the missile and three linear equations for estimating the velocity $[v_x, v_y, v_z]$ of the missile results in the solution $s_j=(p_j,v_j)^T$ for the TBM state at time $t_n$. Furthermore, taking the average of the calculated position [x, y, z] and velocity $[v_x, v_y, v_z]$ for the different combined equation permutation sets, results in the complete measurement estimates:

$$s_e=(p_e(t_n)v_e(t_n))^T \tag{Eq. 13}$$

The accuracy for the complete measurement estimate $s_e$ is given by the estimated covariance matrix:

$$P = \left[\sum_{j=1}^{K}(s_j - s_e(t_n))\times(s_j - s_e(t_n))^T\right]/K \tag{Eq. 14}$$

For the combined set of equations for permutation j, the error covariance matrix is given by $Cov_j$. Taking the average over all permutations K results in:

$$Cov_m == \left[\sum_{j=1}^{K} Cov_j\right]/K \tag{Eq. 15}$$

The measurement covariance matrix for the complete measurement estimate is given by $$P_e=P+Cov_m \tag{Eq. 16}$$

It will be understood that in alternative embodiments of the invention, alternative known methods may be used to estimate the position and velocity of the missile when the number of measurements N>3.

If the number of measurements taken in time interval $\Delta t$ is less than 3, the full measurement vectors of range, Doppler velocity and angular data may be fed directly to the TBM filter to provide estimates of position and [x, y, z] velocity $[v_x, v_y, v_z]$.

The methods described above have the advantage that they provide a faster acquisition of a more accurate TBM state estimate. The accurate estimation of the TBM state (position velocity) leads to a timely prediction that a civilian or military target is threatened. This means that it is possible to warn civilians and or military personnel in time to take appropriate evasive action. Early interception of the TBM by an appropriate anti-TBM missile defense system is thus possible. Moreover, it may even be possible to determine the launch site of the TBM.

It will be understood that although the foregoing examples have described for the tracking of TBM, it will be understood that the method may be applied to the tracking of other types of object.

Moreover, although the foregoing examples have been described for terrestrial defense systems in further embodiments of the invention the method could be applied for sea operations. Many modern navies are involved in peace keeping operations which are carried out in naval operations areas where a large number of hostile threats, often difficult to detect are deployed. Especially dangerous are pop-up targets such as fighters and missiles which are detected at relatively short ranges. Normally these kind of targets use the cover of terrain features or are fired at short ranges.

The above methods of tracking could also be applied to a network of radar sensors located in airspace to form an accurate track of a threatening object so that immediate action may be possible to intercept the threat.

Many further modifications and variations will suggest themselves to those versed in the art upon making reference to the foregoing illustrative embodiments, which are given by way of example only and which are not intended to limit the scope of the invention.

The invention claimed is:

1. A method of tracking an object, the method comprising the steps of:
    collecting N measurements of range $R_i$, and Doppler velocity $D_i$, associated with the object from a plurality of M radar sensors $S_i$, each measurement being assigned a time stamp $t_i$;
    time aligning each range measurement $R_i$, to a common time stamp $t_N$ to provide a corresponding time aligned range $P_i$, for sensor $S_i$ for each of the N measurements, the time aligned range determined in accordance with the following relationship:

$$P_i=R_i+D_i\times(t_N-t_i)$$

wherein × indicates scalar multiplication, and the time aligned range $P_i$, for each sensor $S_i$, $i\in[1,\ldots,N]$, is used to determine a sphere in accordance with the following relationship:

$$(x-a_i)^2+(y-b_i)^2+(z-c_i)^2=(P_i)^2$$

wherein $a_i$, $b_i$, and $c_i$, are the Cartesian co-ordinates of sensor $S_i$ and [x, y, z] is an estimated position vector of the object;

the method further comprising the steps of:

calculating a spherical equation corresponding to each of N time aligned range measurements $P_i$, to produce N spherical equations; and deriving analytical solutions from three predetermined spherical equations of the N spherical equations to determine a position vector of the object.

2. The method according to claim 1 wherein each range measurement $R_i$, and Doppler velocity measurement $D_i$, is assigned to an object track.

3. The method according to claim 1, further comprising, if the number of measurements N is greater than three:

determining each permutation of three out of N spherical equations; and determining analytical solutions for each permutation of three out of N spherical equations.

4. The method according to claim 1, further comprising the step of:

estimating the position vector of the object by a determination of the intersection of the spheres $(x-a_i)^2 + (y-b_i)^2 + (z-c_i)^2 = (P_i)^2$ defined for three predetermined sensors of the N sensors $S_i$.

5. The method according to claim 1, further comprising the step of estimating a velocity vector of the object as a function of the position vector of the object and the Doppler velocity $D_i$, data.

6. The method according to claim 5, wherein the step of estimating the velocity vector of the object further comprises the steps of:

calculating a corresponding vector $E_i$, between the estimated position vector of the object [x, y, z] and the position vector $S_i = [a_i, b_i, c_i]$ of each of the N sensors $S_i$ in accordance with the following relationship:

$$E_i = [x-a_i, y-b_i, z-c_i]^T,$$

wherein T is a transposition operator and $|E_i|$ is the length of vector $E_i$;

calculating the Doppler velocity $D_i$, in accordance with the following relationship:

$$D_i = (E_i)^T * v / |E_i| = [(x-a_i) \times v_x + (y-b_i) \times v_y + (z-c_i) \times v_z]/|E_i|$$

wherein * indicates matrix multiplication, × indicates scalar multiplication, and $v = [v_x, v_y, v_z]$ is the estimated velocity vector of the object at the common time stamp $t_N$ and is estimated by use of the N measurements;

calculating the corresponding unit vector in accordance with the following relationship: $e_i = E_i/|E_i|$; and solving the N resulting linear equations to produce the estimated velocity vector.

7. The method according to claim 6, wherein analytical solutions are derived from three of the N linear equations to determine the estimated velocity vector of the objects.

8. The method according to claim 7, wherein each permutation of three out of N linear equations are used to derive analytical solutions when N is greater than three.

9. The method according to claim 1, further comprising calculating at least one of an accuracy of the estimated position vector and an accuracy of the estimated velocity vector.

10. The method according to claim 1, wherein the accuracy of the estimated position vector and an accuracy of the estimated velocity vector are each calculated by a method comprising the steps of:

expressing a real object state as a vector function f(P(t)) wherein:

P(t) is determined in accordance with the relationship $$P(t) = (R_1^*(t), R_2^*(t), R_3^*(t), D_1^*(t), D_2^*(t), D_3^*(t),)^T,$$

wherein $R_i^*(t)$, corresponds to the real range of the object for sensor $S_i$, and $D_i^*(t)$ corresponds to the real Doppler velocity of the object for sensor $S_i$;

determining a non-linear vector function f from the estimated position vector and the estimated velocity;

expressing the estimated target position at time t by the vector function $f(P_e(t))$ wherein the vector $P_e(t)$ is determined in accordance with the following relationship:

$$P_e(t) = (P_1(t), P_2(t), P_3(t), D_1(t), D_2(t), D_3(t),)^T,$$

wherein t is the time of the most recent measurement of three measurements, $P_i(t)$ is the time aligned range measured by the sensor $S_i$, and $D_i(t)$ is a Doppler velocity measured by the sensor $S_i$;

linearizing P(t) in a neighborhood of $P_e(t)$ to produce a linearized P(t) in accordance with the following relationship:

$$f(P(t)) = f(P_e(t)) + F * (P(t) - P_e(t))$$

wherein F is a Jacobian of the function f(P(t)) which is determined for the vector $P_e(t)$;

calculating an error covariance matrix for a TBM target state in accordance with the following relationship:

$$E((f(P(t)) - f(P_e(t)))^* (f(P(t)) - (t)))^T)$$

wherein E is an expectation, T indicates the transpose operation and $f(P_e(t))$ is an estimated mean of an underlying probability density function; and substituting a solution for the vector function f(P(t)) to produce an analytical expression in accordance with the following relationship:

$$\text{Cov} = E((f(P(t)) - f(P_e(t)))^* (f(P(t)) - f(P_e(t)))^T) = F*E((P(t) - P_e(t))^* (P(t) - P_e(t))^T) * F^T$$

wherein matrix $E((P(t) - P_e(t))^* (P(t) - P_e(t))^T)$ is a diagonal matrix in which terms are time aligned variances of the time aligned $(P_i, D_i,)$ measurements produced by the N sensors $S_i$.

11. The method according to claim 10, wherein analytical solutions are derived from three out of the N linear equations to determine the accuracy.

12. The method according to claim 11, wherein each permutation of three out of N linear equations are used to derive analytical solutions when N is greater than three.

13. The method according to claim 1, further comprising the step of filtering at least one of the estimated position vector of the object, the velocity vector of the object, the accuracy to re-estimate the position of the object, the velocity of said object and the accuracy respectively.

14. The method according to claim 1, further comprising the step of filtering at least one of the estimated position vector of the object, the estimated velocity vector of the object, the accuracy of the estimated position vector and the accuracy of the estimated velocity vector to predict the track of the object.

15. A device for tracking an object, the device comprising:

a data collector to collect information signals including range measurement data $R_i$, and Doppler velocity data $D_i$, associated with an object from a plurality of radar sensors $(S_i)$ each range data $R_i$, having a time stamp $t_i$;

a time alignment apparatus to align the time of each range measurement $R_i$, to a common time stamp $t_N$ to provide a corresponding time aligned range $P_i$, for each of the N measurements;

a processor configured to use each time aligned range measurement $P_i$, to define a corresponding spherical equation such that N spherical equations are defined, the processor operable to determine a position vector of the object according to the method of claim 2; and deriving analytical solutions from three out of the N spherical equations to determine the position vector of the object.

16. The device according to claim 15 further comprising an apparatus to assign each range measurement $R_i$, and Doppler velocity measurement $D_i$, to an object track.

17. The device according to claim 15, wherein the processor is configured to estimate a velocity vector of the object in terms of the position vector of the object and Doppler data $D_i$.

18. The device according to claim 15 wherein the processor is configured to determine the position vector of the object by performing the steps of:

collecting N measurements of range $R_i$, and Doppler velocity $D_i$ associated with the object from a plurality of M radar sensors $S_i$, each measurement being assigned a time stamp $t_i$;

time aligning each range measurement $R_i$, to a common time stamp $t_N$ to provide a corresponding time aligned range $P_i$, for sensor $S_i$ for each of the N measurements, the time aligned range determined in accordance with the following relationship:

$$P_i = R_i + D_i \times (t_N - t_i)$$

wherein × indicates scalar multiplication and the time aliened ranee $P_i$, for each sensor $S_i$, $i \in [1, \ldots, N]$, is used to determine a sphere in accordance with the following relationship:

$$(x-a_i)^2 + (y-b_i)^2 + (z-c_i)^2 = (P_i)^2$$

wherein $a_i$, $b_i$, and $c_i$, are the Cartesian co-ordinates of sensor $S_i$ and [x, y, z] is an estimated position vector of the object;

the method further comprising the steps of:

calculating a spherical equation corresponding to each of N time aligned range measurements $P_i$, to produce N spherical equations; and deriving analytical solutions from three predetermined spherical equations of the N spherical equations to determine a position vector of the object, wherein each range measurement $R_i$, and Doppler velocity measurement $D_i$, is assigned to an object track.

19. The device according to claim 15, wherein the processor is configured to calculate at least one of an accuracy of the estimated position vector of the object and the estimated accuracy of the velocity vector by performing the steps of:

collecting N measurements of range $R_i$, and Doppler velocity $D_i$ associated with the object from a plurality of M radar sensors $S_i$ each measurement being assigned a time stamp $t_i$;

time aligning each range measurement $R_i$, to a common time stamp $t_N$ to provide a corresponding time aliened range $P_i$, for sensor $S_i$ for each of the N measurements, the time aligned range determined in accordance with the following relationship:

$$P_i = R_i D_i \times (t_N - t_i)$$

wherein × indicates scalar multiplication and the time aliened range $P_i$, for each sensor $S_i$, $i \in [1, \ldots, N]$, is used to determine a sphere in accordance with the following relationship:

$$(x-a_i)^2 + (y-b_i)^2 + (z-c_i)^2 = (P_i)^2$$

wherein $a_i$, $b_i$, and $c_i$, are the Cartesian co-ordinates of sensor $S_i$ and [x, y, z] is an estimated position vector of the object;

the method further comprising the steps of:

calculating a spherical equation corresponding to each of N time aligned range measurements $P_i$, to produce N spherical equations; and deriving analytical solutions from three predetermined spherical equations of the N spherical equations to determine a position vector of the object, wherein each ranee measurement $R_i$, and Doppler velocity measurement $D_i$, is assigned to an object track.

20. The device according to claim 15 further comprising a filter to filter at least one of the estimated position vector of the object, the estimated velocity vector of the object, the estimated accuracy of the position vector, and the estimated accuracy of the velocity vector.

21. A tracking system for tracking an object comprising a plurality of radar sensors $S_i$ for providing information signals including range measurement data $R_i$, and Doppler velocity data $D_i$, associated with said object, and a device according to claim 15.

22. A software program product stored on a storage medium, the software product configured to carry out a method of tracking an object, the method comprising the steps of:

collecting N measurements of range $R_i$, and Doppler velocity $D_i$, associated with the object from a plurality of M radar sensors $S_i$, each measurement being assigned a time stamp $t_i$;

time aligning each range measurement $R_i$, to a common time stamp $t_N$ to provide a corresponding time aligned range $P_i$, for sensor $S_i$ for each of the N measurements, the time aligned range determined in accordance with the following relationship:

$$P_i = R_i + D_i \times (t_N - t_i)$$

wherein × indicates scalar multiplication, and the time aligned range $P_i$, for each sensor $S_i$, $i \in [1, \ldots, N]$, is used to determine a sphere in accordance with the following relationship:

$$(x-a_i)^2 + (y-b_i)^2 + (z-c_i)^2 = (P_i)$$

wherein $a_i$, $b_i$, and $c_i$, are the Cartesian co-ordinates of sensor $S_i$ and [x, y, z] is an estimated position vector of the object;

the method further comprising the steps of:

calculating a spherical equation corresponding to each of N time aligned range measurements $P_i$, to produce N spherical equations; and deriving analytical solutions from three predetermined spherical equations of the N spherical equations to determine a position vector of the object.

* * * * *